United States Patent [19]

Kogelschatz et al.

[11] 4,385,261
[45] May 24, 1983

[54] METHOD AND APPARATUS FOR THE EXECUTION OF GAS DISCHARGE REACTIONS

[75] Inventors: Ulrich Kogelschatz, Hausen; Jiri Mastner, Niederrohrdorf; Klaus Ragaller, Neuenhof, all of Switzerland

[73] Assignee: BBC Brown, Boveri & Company, Limited, Baden, Switzerland

[21] Appl. No.: 174,259

[22] Filed: Jul. 31, 1980

[30] Foreign Application Priority Data

Aug. 2, 1979 [CH] Switzerland ............... 7101/79

[51] Int. Cl.³ ............... H05B 37/00; H05B 39/00
[52] U.S. Cl. ............... 315/170; 315/171; 315/173; 315/175; 422/186.12; 422/186.16
[58] Field of Search ............... 315/170, 171, 173, 174, 315/175; 422/186.12, -186.18

[56] References Cited

U.S. PATENT DOCUMENTS

| | | | |
|---|---|---|---|
| 3,154,721 | 10/1964 | Sommeria | 315/172 |
| 3,876,855 | 4/1975 | Hirasawa et al. | 315/172 |
| 4,025,441 | 5/1977 | Tabata et al. | 422/186.19 |
| 4,027,169 | 5/1977 | Lowther | 422/186.16 |
| 4,097,786 | 6/1978 | Koizumi et al. | 315/174 |
| 4,123,664 | 10/1978 | Yamamura et al. | 422/186.18 |
| 4,128,788 | 12/1978 | Lowther | 315/167 |
| 4,216,096 | 8/1980 | Pare et al. | 313/332 |
| 4,283,291 | 8/1981 | Lowther | 422/186.15 |
| 4,293,797 | 10/1981 | Gerry | 315/170 |

*Primary Examiner*—Saxfield Chatmon, Jr.
*Attorney, Agent, or Firm*—Oblon, Fisher, Spivak, McClelland & Maier

[57] ABSTRACT

A method and apparatus for producing gas discharge reactions in which a reaction gas is at least partially oxygenated after being taken through a discharge channel. In order to produce ozone by means of an electric discharge, the discharge channel has applied thereto an electric alternating voltage signal consisting of a sinusoidal potential ($U_a$) with positive and negative peak values minimally below the firing potential of the discharge channel, and of alternating voltage impulses superimposed on the sinusoidal potential essentially at the respective maximum and minimum values, in order to achieve an exalted potential above the firing potential to enable a discharge reaction. An ozonizer implemented in this way is also disclosed.

17 Claims, 15 Drawing Figures

METHOD AND APPARATUS FOR THE EXECUTION OF GAS DISCHARGE REACTIONS

BACKGROUND OF THE INVENTION

1. Field of the Invention

This invention relates to a method and apparatus for producing gas-discharge reactions especially for use in connection with the production of ozone, and to an ozonizer provided for that purpose.

2. Description of the Prior Art

Methods and apparata for the execution of gas-discharge reactions are used in particular for the production of ozone out of oxygen, since ozone, being a strong oxidant, is used for sewage treatment, air cleaning, drinking-water treatment and food storage as well as in medicine and chemistry.

A method and a apparatus for the execution of corona-discharge reactions is known from DE-OS 26 17 104 (Disclosure Document 26 17 104), whereby a reaction gas is taken through a corona-discharge gap, electric energy in the form of narrow pulses being applied across this gap, thereby introducing energy to the electrodes and gas-ions present in the gap, causing the creation of a corona-discharge. In order to obtain a productive reaction of the reaction gas, the electrones are charged with energy. The gas-ions created by the reaction are removed from the gap, in order to minimize any unproductive charging with energy of the ions. The removal of the gas ions is achieved by means of a potential applied in the time interval between the narrow impulses. The gas-ions may also be neutralized by an addition of negatively charged finely distributed particles of moisture or solid matter. The method is used for the production of ozone, whereby ozone is produced from a gas mixture which contains oxygen as well as considerable amounts of moisture and other pollutants.

With a method of this type, the impulses are created by a relatively sohpisticated circuitry wherein a switching element is placed in a position of switching the full potential to produce the discharge.

SUMMARY OF THE INVENTION

Accordingly, one object of this invention is to provide a novel method and apparatus for producing a gas discharge such as for the production of ozone, by which a destruction of the ozone formed is prevented, in an economical and constructively simple manner, and where large amounts of ozone may be produced with relatively minor energy input.

Another object is to provide a novel method and apparatus of the above-noted type wherein a homogenous gas discharge is achieved and wherein the voltage pulse introduced into the discharge gap ceases before the discharge reverts into a spark- or arc discharge, so that a destruction of the gas formed is prevented.

These and other objects are achieved according to Applicants' invention by providing a new and improved method for triggering a discharge reaction of a reaction gas passing through a discharge channel provided with two electrodes, by applying electric alternating potential signal across the discharge channel, including generating first and second alternating potential signal components, each having maximum and minimum voltage portions, superimposing the second alternating potential component on the first alternating potential component with the minimum and maximum portions of the first component aligned with respective minimum and maximum portions of the second component in order to create a composite alternating voltage signal having voltage exaltations, and applying the composite alternating potential signal across a discharge channel. Advantageously, by this method the circuit elements must switch only the superimposed second component. Furthermore, by generating the second voltage component in the form of impulses, it is possible to bring, for a short period of time, the operating voltage close to a predetermined stationary firing potential below which a discharge reaction cannot take place, which is most advantageous for ozone production. When a second component characterized by a sharp leading edge is produced, superimposition thereof to the operating voltage can be achieved with particular speed.

Additionally, by generating the first alternating voltage component with peak voltage levels slightly less than the stationary firing potential, it is possible to reduce the demands made on the circuit elements which must switch the second superimposed voltage component. Particularly high composite voltages can then be achieved. By superimposing the second alternating potential component on the first component at a moment where the latter is slightly beneath the stationary firing potential with the composite voltage then exceeding the stationary firing potential, there is guaranteed a homogeneous firing of the discharge achieved by a relatively low energy second alternating voltage component. Generation of a first alternating potential component as a sinusoidal, a trapezoidal-, or a rectangular alternating potential has proven to be particularly favorable to increasing ozone yield.

The method of the invention is particularly suited for the production of ozone from oxygen or an oxygenated gas.

A particularly low cost and reliable circuit for implementing the above-described method of the invention includes a transformer having a primary winding coupled to a source of alternating potential and a secondary winding across which is connected a storage capacitor which stores the first alternating potential component based on the potential waveform produced by the source. An impulse capacitor is coupled between the secondary winding and the electrodes of the discharge channel, with a switching element bridging the impulse capacitor for shorting the impulse capacitor when the potential thereacross exceeds the stationary firing potential, whereby the first and second components are superimposed upon switching of the switching element. Advantageously, an air gap can be employed as the switching element.

In a particularly advantageous embodiment, an impulse capacitor and a storage capacitor are connected in series bridging a pair of source terminals with an air gap switching element connected in series between the electrodes of the discharge channel and the source terminal coupled to the impulse capacitor, this latter series circuit connected in parallel to the series connection of the impulse capacitor and the storage capacitor, wherein a choke is connected between a connection point of the impulse capacitor and the storage capacitor and the connection point of the air gap switching element and the electrode of the discharge channel to which the air gap switching element is connected. In this way, energy losses because of shortcircuit discharges of the impulse capacitor can be avoided, which means that the stored energy is discharged through the discharge gap. Another choke may be disposed in series between the connection point of the first choke to the air-gap switching element and the electrodes of the discharge channel, which enables the possibility of adjusting the leading edge of the superimposed current impulse to the value most favorable to ozone production. Also, instead of employing an air gap as the switching element, a semiconductor device, for example a breakover diode or an anti-parallel circuit of two breakover diodes, may be used to increase the switching precision and the life of the switching element considerably.

In a further embodiment, an inductive impedence is connected in series from a source input terminal to the series circuit of the impulse and storage capacitors and serves as an inductive voltage divider which makes it possible to give the impulse capacitor free and preferably very small dimensions, whereby the impulse capacitor may be integrated directly into an ozonizer structure.

In another embodiment, first and second transformers are provided, each having respective primary and secondary windings wherein the primary windings thereof are coupled to respective first and second sources of alternating potential and wherein the secondary winding of the second transformer is provided with a tap-off connection point. A series circuit formed by a first rectifier element, a first choke, a first impulse capacitor, a second impulse capacitor, a second choke and a second rectifier are provided bridging the secondary winding of the second transformer with the interconnection point between the first and second impulse capacitors connected to the tap-off connection point of the secondary winding of the second transformer, and with the rectifier elements arranged in polarity opposition so that voltages opposite in sign are developed across the first and second impulse capacitors. First and second switching elements, each having a first side respectively connected to the interconnection point of the first choke and the first impulse capacitor, and the interconnection of the second choke and the second impulse capacitor, and each having second sides mutually interconnected to one of the electrodes of the discharge channel are provided. A storage capacitor is connected across the secondary winding of the first transformer and a third choke is connected between one side of the storage capacitor and the first electrode of the discharge channel, with the interconnection point of the storage capacitor and the third choke connected to the interconnection point between the first and second impulse capacitors. The advantage of this embodiment resides in the fact that the circuit elements must switch only the second alternating voltage component and must inhibit double the value thereof. Thereby, only the two switching elements, as well as the impulse capacitors in the storage capacitor must be arranged directly within the discharge channel, or be integrated within the ozonizer, respectively. All other circuit elements may be separately designed. Use of one impulse capacitor for each of the positive and negative polarity swings results in the advantage that the impulse capacitors must not be recharged, which always entails energy losses.

According to the invention, additional semiconductor switching elements are possible. A rectifier crowbar circuit having a voltage sensitive switching device disposed in the D.C. path thereof may be used, or a breakover diode or an anti-parallel circuit formed of two breakover diodes as noted above may be used, which has the advantage that only one single circuit element is needed for both polarities. Otherwise, a thyristor, zener diode, and diode combination with the zener diode and diode connected in series between the gate electrode and the anode of the thyristor, or anti-parallel connected of such thyristor circuits, may be employed which makes the requirement for a rectifier circuit superfluous.

Further according to the invention, an ozonizer provided with at least two electrodes located opposite each other and defining at least one discharge channel may be constructed in the form of an electrically conductive outer tube, an electrically insulating inner tube arranged within the outer tube electrically insulated and physically distant therefrom, with the inner tube having an inner surface provided with an electrically conductive layer which, together with the electrically conductive outer tube, forms the electrodes of the ozonizer. The ozonizer further includes an electrically conductive inner body provided within the electrically insulated inner tube and a switching element connected between the electrically conductive inner body and the electrically conductive layer formed on the inner surface of the inner tube. Construction of an ozonizer in this manner, as well as in further embodiments hereinafter described, makes it possible to integrate the circuit elements for the creation of the voltage exaltation directly into the ozonizer structure, thereby avoiding lead-in inductivities and the influences of inductivity which can otherwise reduce considerably the desired fast impulse rise time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
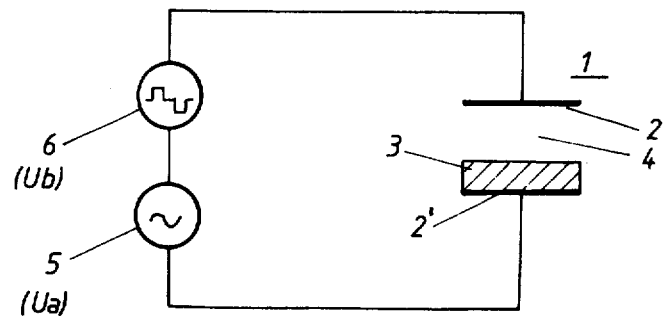
FIG. 1a is a schematic circuit diagram of an apparatus for implementing of the method of the invention.
Figure 1B:
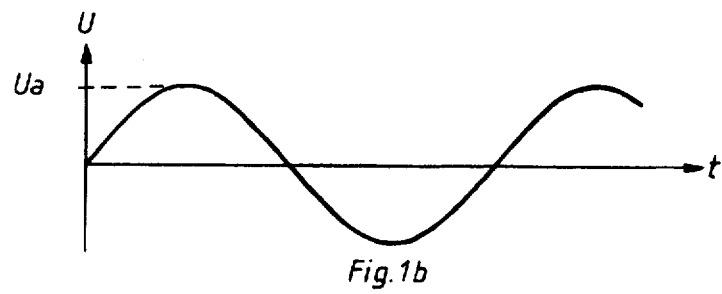
FIGS. 1b, 1c and 1d are graphs in which the voltages applied across the electrodes of the discharge gap are plotted along the ordinates versus time along the ascissa, showing preferred forms of potentials used for the creation of the discharges.
Figure 1C:
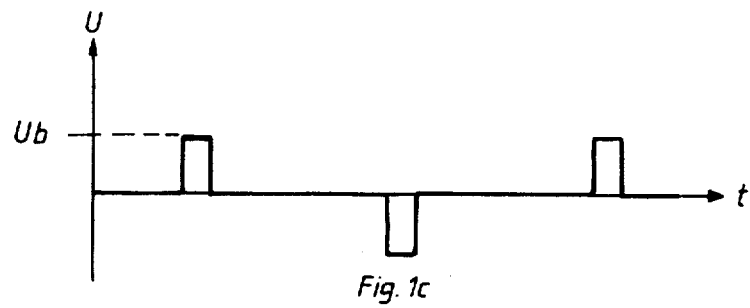
Figure 1D:
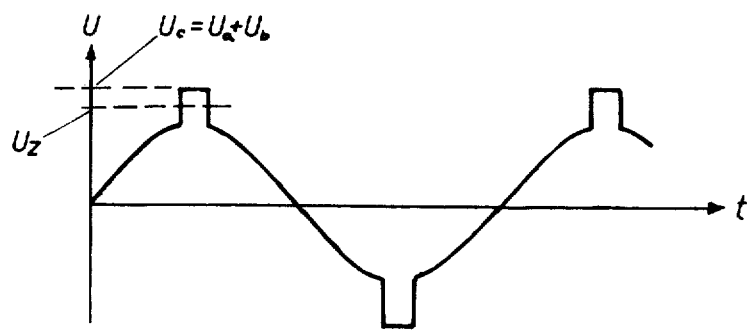

Referring now to the drawings, wherein like reference numerals designate identical or corresponding parts throughout the several views, and more particularly to FIG. 1a thereof, is an ozonizer consisting of two parallel, electrically conductive plate-shaped electrodes 2, 2' which are separated from each other by a dielectric layer 3 having a uniform thickness, as well as by a discharge gap 4. The dielectric layer 3 is arranged at the surface of the electrode 2', so that the discharge gap 4 runs between the dielectric layer 3 and the electrode 2. The electrode 2', carrying the dielectric layer 3 is connected to an alternating potential source 5, switched in series with an impulse source 6. The impulse source 6 is connected to the electrode 2. As shown in FIG. 1b, the alternating potential source 5 creates a sinusoidal alternation wave $U_a$ running symmetrically to the t-axis is applied across electrodes 2, 2' and the maxima and minima of which are below the stationary firing potential $U_z$ which is needed for the triggering of the gas discharge within the discharge gap 4. The impulse source 6 creates rectangular alternating voltages $U_b$ such as are shown in FIG. 1c. According to FIG. 1c the alternating impulses $U_b$ of the sinusoidal voltage $U_a$ overlap in their maxima and minima to form an alternating voltage signal $U_c$, the maximum voltage of which exceed the firing voltage $U_z$.

The mode of operation of the object of the invention is as follows. An oxygenated gas mixture or pure oxygen flows through the discharge gap 4. The electrodes 2, 2' of the ozonizer 1 are given the sinusoidal voltage $U_a$ (for instance 50 Hz), which has a peak value of somewhat below the firing potential $U_z$. Within the area of the voltage maximum or minimum, respectively, it is superimposed by a fast voltage impulse which has a sharp leading edge. Thereby the total potential rises for a brief period, for instance within 20 ns above the firing potential $U_z$, achieving a homogenous discharge within the gas mixture, leading to the formation of ozone from the created oxygen atoms and the still remaining molecular oxygen. The fast voltage impulse may last for 100 ns, as an example, and it is concluded before the discharge can become a spark or arc discharge. In this manner a local heating of the gas and thus a destruction of the created ozone is prevented. A rectangular alternating voltage or a delta alternating voltage may be used in the place of the sinusoidal alternating voltage $U_a$. The shape of the superimposed voltage impulses is not limited to the rectangular form, but they must have a sharp leading edge which is in temporal location within the positive and negative extreme-values of the first alternating voltage component $U_a$.

Figure 2:
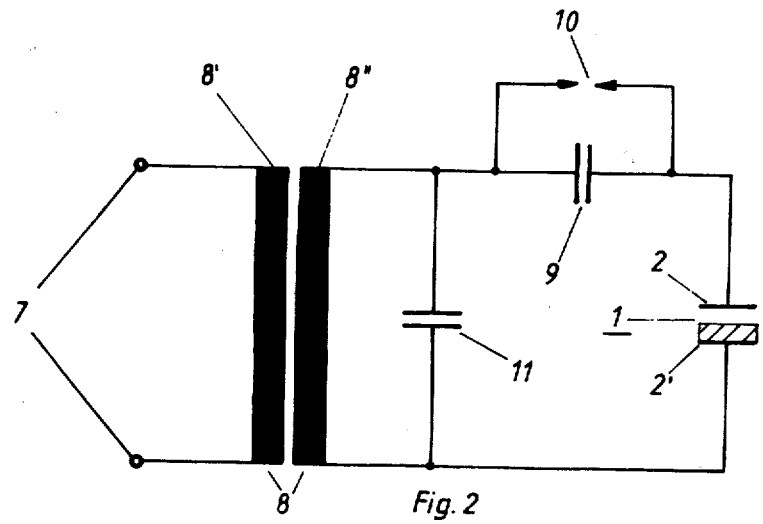
FIG. 2 to FIG. 7, inclusive, are preferred circuit diagrams of preferred circuit arrangements for producing the desired discharges.

In the circuit arrangement shown in FIG. 2, the electrodes 2, 2' of the ozonizer are connected with the secondary coil of a transformer 8, which consists of a primary coil 8' with connecting clamps 7 and the secondary coil. The connection of the electrodes 2, 2' with the secondary coil terminals 8'' of the transformer 8 is bridged by a storage capacitor 11. The storage capacitor 11 is connected with the electrode 2 by way of an air gap capacitor 9 bridged by an air gap 10.

The manner of the operation may essentially be seen from the description in connection with FIG. 2. The suitable sinusoidal voltage $U_a$ between 10 Hz and 100KHz comes from the transformer 8 which is being loaded by the storage capacitor 11. By bridging the air gap capacitor 9, an exalted voltage $U_b$ is created at the ozonizer during the firing of the air gap spark 10. The storage capacitor 11 by way of the air gap 10 furnishes the charge required for charging the capacity of the ozonizer to its full potential $U_c$.

Figure 3:
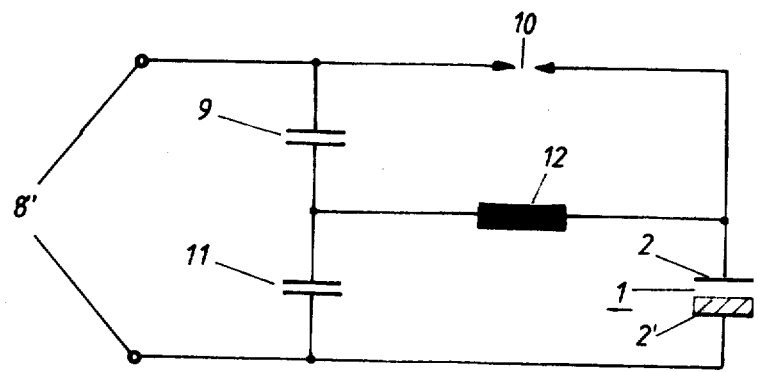

A similar circuit arrangement is shown in FIG. 3. The capacitor 9 here is connected in series with the storage capacitor 11, their connection being connected to the electrode 2 of the ozonizer 1 by way of a first throttle or choke 12.

The manner of operation may be seen essentially from the description in connection of FIG. 1 and 2. By the arrangement of the capacitor 9 and the first choke 12 a short-circuit discharge of the capacitor 9 is prevented and it becomes possible to utilize the additionally stored charge for the increase of the potential in the ozonizer 1.

Figure 4:
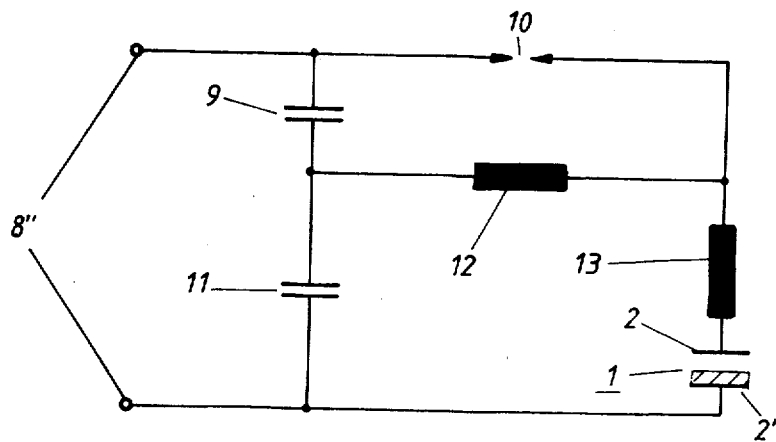

The structure of the circuit arrangement of FIG. 4 corresponds to the structure of the circuit arrangement shown in FIG. 3. Between the point of connection of the first choke and the electrode 2, however, an additional second choke 13 is arranged, which, given suitable dimensions, produces the optimum suitable leading edge of the alternating current impulse for ozone production.

The use of breakover diodes as circuit elements in the place of the air gap capacitor 10 is possible; their structure and operation is described for instance in the BBC-publication D HS 704 68 EFD.

Figure 5:
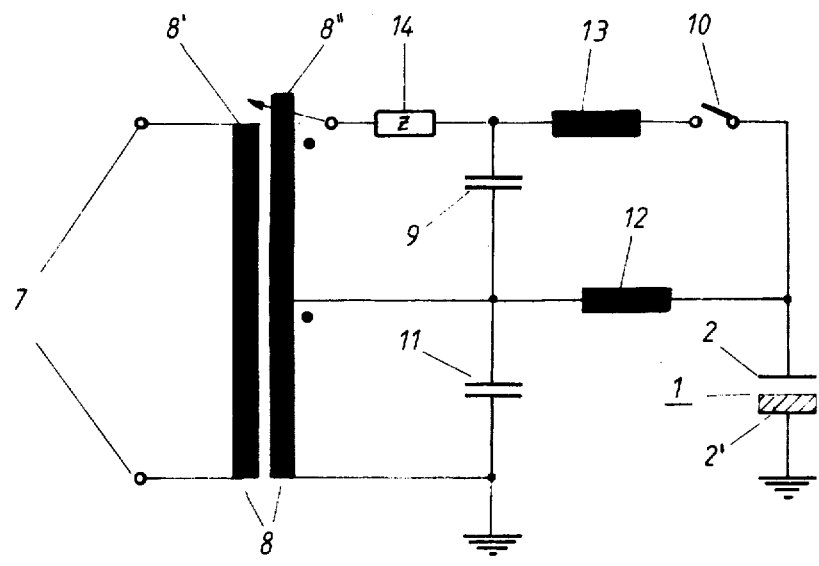

The circuit arrangement according to FIG. 5 essentially correspond to that of FIG. 4. The electrode 2' with the dielectric layer 3 and the connection of the secondary coil 8'' of the transformer 8 with the storage capacitor 11, however, are grounded. The connection of the circuit capacitor 9 with the storage capacitor 11 is connected with the secondary coil of the transformer 8, and the line leading to the point of connection of the circuit capacitor 9 is connected, by way of an impedance 14, as an inductive voltage-divider. The second choke 13 is arranged between the circuit element 10 and the connecting point of the circuit capacitor 9 to the line between the impedance 14 and the circuit element 10.

The manner of operation is seen in FIG. 1 and FIG. 4. The impedance 14 permits prompt charging of the capacitor 9 and prevents any massive shorts of the secondary coil by way of the second choke 13, the circuit element 10 and the first choke 12. The impedance 14 may be non-linear also, as, for instance, a controlled rectifier for both polarities. The second choke 13, if properly dimensioned, will create the best suitable leading edge of the alternating current impulse for optimum ozone production. A connection to the transformer as an inductive voltage divider permits freedimensioning of the capacitors.

Figure 6:
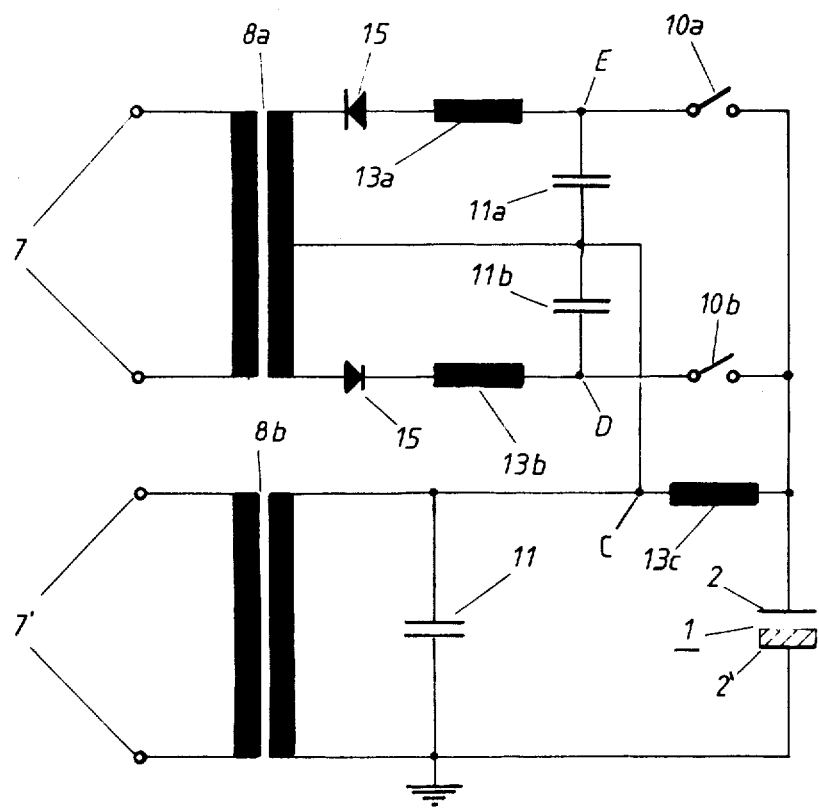

According to FIG. 6, the potential $U_a$ with a frequency of 10 Hz to 100k Hz is fed by way of a first transformer 8b directly from the power line or by way of inverter terminals 7' coming from an inverter (not shown). The shape of the voltage-path is optional, for instance it may be a sinusoidal-trapezoidal, or rectangular potential. The peak voltage lies somewhat underneath the firing voltage $U_z$ of the ozonizer 1. A second transformer 8a or a separate coil of the first transformer 8b charges the two impulse capacitors 11a, 11b by way of rectifier diodes 15 to a potential $\Delta U_1$ (capacitor 11a), or $\Delta U_2$ (capacitor 11b) respectively. The circuit elements 10a, 10b, which may be mechanical switches, circuit spark gaps, circuit tubes or semi-conductor elements, such as, for instance breakover diodes, are triggered to switching action whenever they are close to the maximum of the positive sinusoidal curve, or the negative sinusoidal curve, respectively. In this manner, the stored charges of the capacitors 11a and 11b are added and result in potential peaks $U_b$. The choke 13c prevents a drainage of the superimposed steep impulses towards the side of the source. Chokes 13a and 13b, if given suitable dimensions, have the same function as the impedance of FIG. 5.

Figure 7:
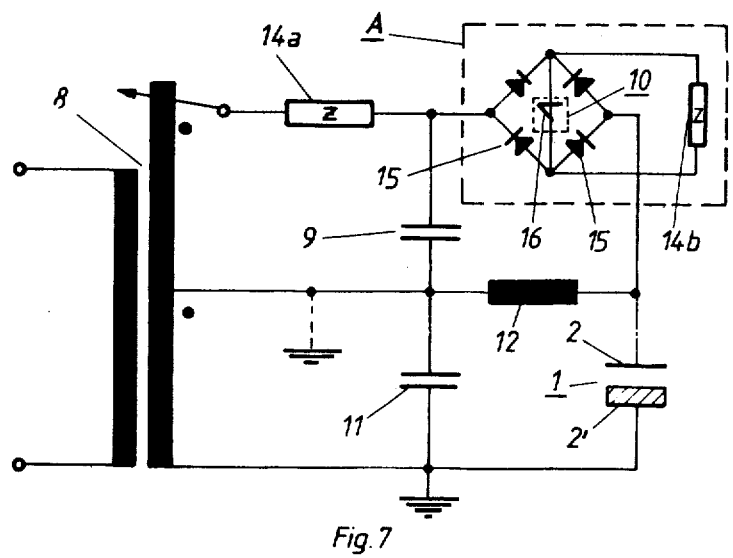

The circuit arrangement according to FIG. 7 essentially corresponds to the circuit of FIG. 5.

Figures 7A, 7B:
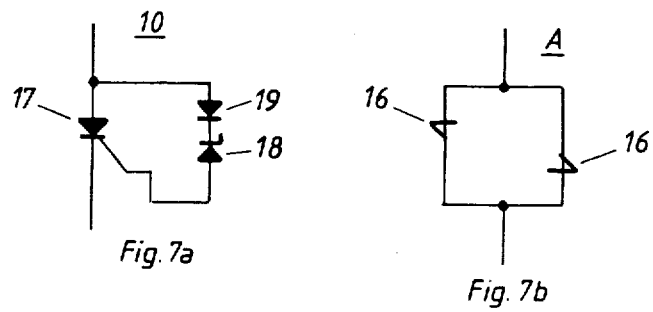
FIG. 7a, 7b and 7c are schematic circuit diagrams representing preferred circuit elements.

As an alternative, the grounding may be performed along the connection of the secondary coil with the connection between the two capacitors 9 and 11. The circuit element A consists of a rectifier with four diodes, a circuit element 10 being connected to its DC output, whereby said D.C. output may additionally be connected with an impedance 14b. The circuit element 10 can be chosen as being either a breakover diode 16 or a circuit arrangement as shown in FIG. 7a. The circuit according to FIG. 7a consists of a thyristor 17, whose gate electrode is connected with the anode of the thyristor 17 by way of a zener diode 18 and a diode 19. In the place of the series circuit of the diode 19 and the zener diode 18, a breakover diode may be used.

The manner of operation may essentially be seen from the description in connection with FIG. 1 and 5. The rectifier has the effect that the circuit element 10 continuously receives a current of the same polarity, which means a current which always flows in the same direction. The impedance 14b, for instance, a high-ohmic resistor, makes it possible to operate the crowbar with a slight bias, by which step the switch-on period may be shortened, if needed.

The dots along the secondary coil of the transformer 8 in FIG. 5 and 7 indicate the connections with identical polarities. The drawing of the connection of the line leading to the impedance 14, or 14a, respectively, at the secondary coil does not represent a control transformer but it symbolizes the possibility of tapping the potential at the desired level.

Figure 7C:
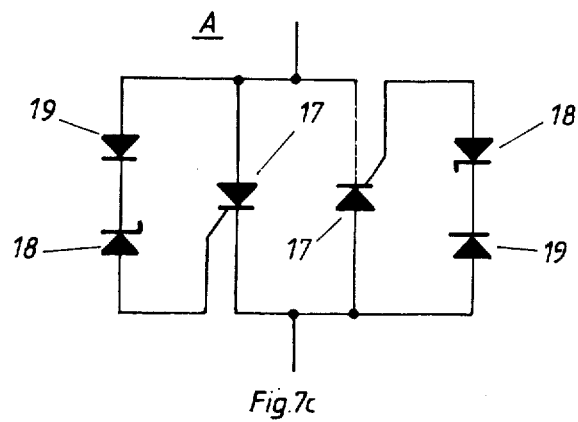

FIG. 7b and 7c show examples of circuits which may be used for the circuit element A. In the circuit shown in FIG. 7b, two breakover diodes 16 are switched antiparallel to each other. If the breakover diodes 16 cannot handle the incoming potential, one diode must be switched in series. The circuit element as shown in FIG. 7c is designed as an antiparallel circuit of two thyristors 17, their gate electrodes each being connected with the anode of the corresponding thyristor by way of a series connection of a zener diode 18 and a diode 19. These two circuit elements can handle the flow of current in both directions, which would make a rectifier unnecessary.

It is the major advantage of the circuit arrangements as described that the circuit elements must switch the potential $U_b$ only and must block the potential $2\,U_b$. In this manner, only the capacitors and the circuit elements must be located in the immediate proximity of the discharge channel 4, or must be integrated into this feature, respectively. The rest of the circuit elements may be arranged separately.

Figure 8:
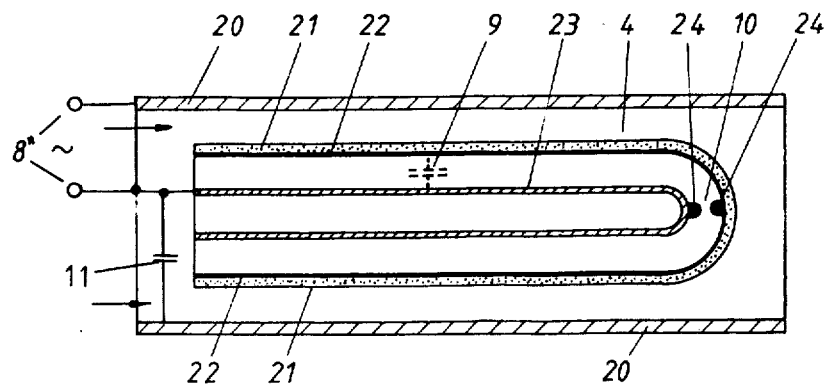
FIG. 8, 9 and 10 are schematic cross-sectional views taken along the longitudinal axis of ozonizers as they may be used within the framework of the present invention.

A possibility of a realization of the arrangement in FIG. 2 is shown in FIG. 8.

For the purpose of shaping a discharge channel 4, a glass tube 21 is arranged within a metal tube 20 at a distance running along the longitudinal axis and parallel to the metal tube. The glass tube 21 at its inner surface has an aluminum layer 22. Inside of the glass tube 21 there is an inner metal tube 23, running parallel to the glass tube at a distance along the longitudinal axis. The glass tube 21 and the inner metal tube 23 are designed as closed U-shaped pipes with equally long legs, which at their closed ends are provided with air gap electrodes 24 located opposite each other and intended for the creation of a discharge gap 10. The inner metal tube 23 and the metal tube 20 are connected to the secondary coil terminals 8" of a transformer 8 by means of conductive wires. A conductive wire is connected directly with the metal tube 20 and also by way of a storage capacitor 11. The air gap capacitor 9 according to FIG. 2 is formed by the aluminum layer 22 of the glass tube 21 and the inner metal tube 23. The metal tube 20 and the aluminum layer 22 of the glass tube 21 which corresponds to the dielectric layer 3, represent electrodes 2, 2'.

The functioning of this arrangement can be seen from the description in connection with FIG. 1 and 2.

Figure 9:
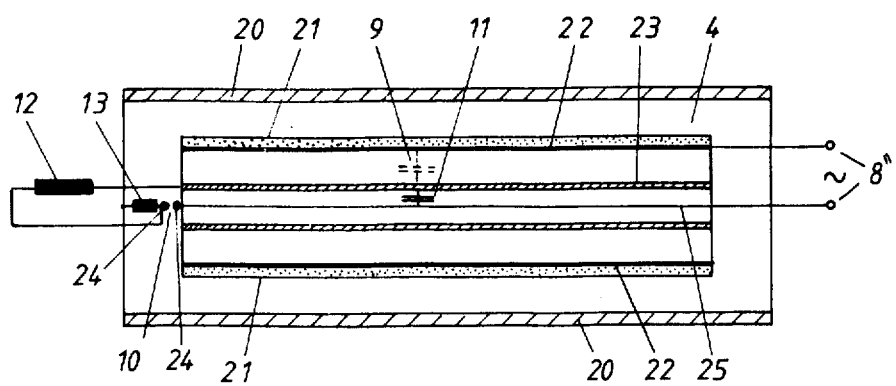

FIG. 9 shows an embodiment of a construction of the ozonizer with a circuit arrangement according to FIG. 4, whereby the design is essentially identical to the ozoniser shown in FIG. 8. The glass tube 21 and the inner metal tube 23 in this case, however, are open at both ends. Within the inner area of the inner metal tube 23, there is an energy supply line 25, which, at one end, is connected to the metal tube 20 by way of a discharge gap 10 with discharge gap electrodes 24 and a second choke 13 switched in sequence thereto, and which, at its other end is connected with the secondary coil of the transformer. The aluminum layer 22 facing away from the discharge gap is equally connected with the secondary coil while the other end of the aluminum layer is connected by way of a first choke 12 between the second choke 13 and the discharge gap 10. The inner metal tube 23 is connected to the energy supply line 25 by way of the storage capacitor 11 arranged within its inner space. The storage capacitor $\beta\beta$ is designed as a cylinder capacitor.

The operation can be seen from the description in connection with FIG. $\beta$ and 4.

Figure 10:
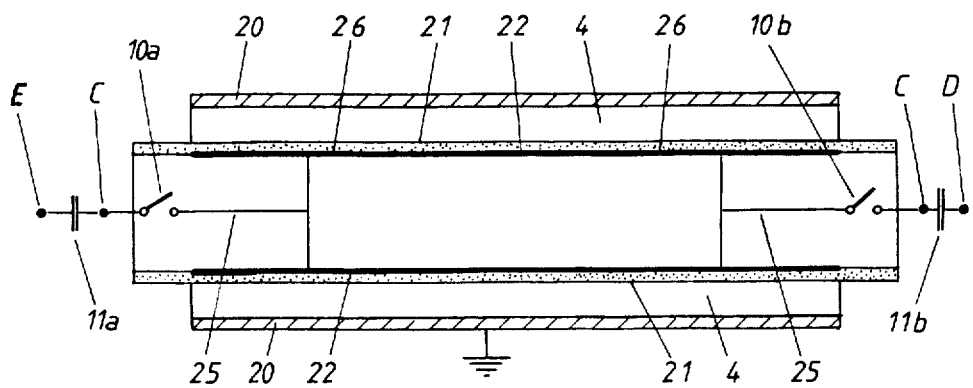

FIG. 10 shows an ozoniser with the circuit of FIG. 6.

The design is essentially the same as that of the ozoniser shown in FIG. 9, but without the inner metal tube 23. The energy supply line 25 is flanged to the respective ends of the aluminum layer 22 of the glass tube 21 by way of a first or second impulse capacitor 11a or 11b, respectively, and by way of a subsequently arranged first or second circuit element 10a or 10b respectively and electrical contacts. The circuit elements 10a, 10b in this case are arranged within the glass tube 21, the impulse capacitors 11a, 11b are located in the immediate proximity of the openings of the glass tube 21.

In the aforedescribed constructive embodiments of the ozonizer the components of the energy supply circuit are integrated or located in immediate proximity of the discharge channel 4. In this manner, inductive influences caused by long feed lines can be kept to a minimum.

NOMENCLATURE

| | |
|---|---|
| 1 | Ozoniser |
| 2 | electrode |
| 2' | electrode with dielectric layer |
| 3 | dielectric layer |
| 4 | discharge gap - discharge channel |
| 5 | alternating potential source |
| 6 | impulse source |
| 7 | connecting clamps (first alternating potential source) |
| 7' | inverter terminals |
| 8 | transformer - first alternating potential source) |
| 8a | second transformer |
| 8b | first transformer |
| 8' | primary coil |
| 8" | secondary coil terminals (output terminals) |
| 9 | Circuit condenser - airgap condenser |
| 10, | 10 circuit element - discharge gap |
| 10a | first circuit element |
| 10b | second circuit element |

| | |
|---|---|
| 11 | storage condenser - second potential source |
| 11a | first impulse condenser |
| 11b | second impulse condenser |
| 12 | first throttle |
| 13 | second throttle |
| 13a, b, c, | inhibiting throttles |
| 14 | impedance |
| 14a | first impedance - inhibiting throttle |
| 14b | second impedance |
| 15 | rectifier element - diodes |
| 16 | Flip diodes |
| 17 | thyristor diodes |
| 18 | Z-diodes |
| 19 | diode |
| 20 | electrically conductive tube - metal tube |
| 21 | electrically insulating inner tube - glass tube |
| 22 | electrically conductive layer - aluminum layer |
| 23 | electrically conductive inner body - inner metal tube |
| 24 | air gap electrodes |
| 25 | energy supply line |
| 26 | electrically conductive contacts |
| A | circuit element |
| $U_a$ | first alternating potential component - sinusoidal alternating potential |
| $U_b$ | second alternating potential component - alternating potential impulses |
| $U_c$ | Alternating potential signal |
| $U_z$ | stationary firing potential |
| C, D, E | corresponding points in FIGS. 6 and 10 |

Obviously, numerous modifications and variations of the present invention are possible in light of the above teachings. It is therefore to be understood that within the scope of the appended claims, the invention may be practiced otherwise than as specifically described therein.

What is claimed as new and desired to be secured by letters patent of the United States is:

1. An ozone production system for producing ozone, said system adapted to be coupled to an energy supply, comprising:

transformer means having at least one primary winding coupled to said energy supply and at least one secondary winding for producing a voltage across said secondary winding, said secondary winding having at least two terminals;

an ozonizer having two electrodes spearated from each other by a discharge gap, at least one of the electrodes covered by a dielectric coating, wherein one of the electrodes is connected to the first terminal of the secondary winding of the transformer means;

storage means coupled to said secondary winding for storing a potential based on a potential waveform produced by said energy supply, said storage means also coupled to said ozonizer;

impulse superposition means coupled to the transformer secondary winding, said storage means and said ozonizer for producing a step increase in the potential across the electrodes of said ozonizer when the potential across said ozonizer electrodes reaches a predetermined level below a critical potential at which a discharge occurs across the ozonizer electrodes, said step increase exceeding said critical potential and producing an ozonizer discharge across the ozonizer electrodes.

2. A system according to claim 1, comprising:
said storage means comprising a storage capacitor coupled to said secondary winding for storing a first alternating potential component based on the potential waveform produced by said energy supply; and said impulse superposition means comprising an impulse capacitor coupled between the secondary winding and said electrodes of said ozonizer, and a switching element bridging said impulse capacitor for shorting said impulse capacitor once the potential across said switching element exceeds a predetermined potential.

3. A system according to claim 2, wherein said switching element comprises:
a spark gap bridging said impulse capacitor.

4. A system according to claim 1, comprising:
said storage means comprising a storage capacitor;
said impulse superposition means comprising an impulse capacitor and a series combination of a switching element and a high frequency choke connected in parallel with said impulse capacitor, wherein the impulse capacitor and the storage capacitor are connected in series and the other electrode ozonizer is coupled to a connection point between the switching element and the first choke.

5. A system according to claim 4, further comprising:
a second choke disposed in series between the connection point of the first choke and the switching element and the electrodes of the ozonizer.

6. A system according to claim 2, wherein said switching element comprises:
a semiconductor device.

7. A system according to claim 6, wherein said switching element comprises:
at least one breakover diode.

8. A system according to claim 4, comprising:
said secondary winding having a tap-off point connected to the connection point between said storage and impulse capacitors;
an inductive impedance serving as an inductive voltage divider coupled between the second terminal of said secondary winding and said impulse capacitor; and
a second choke connected in series with said switching element and the interconnection point of said first choke with said other electrode of said ozonizer.

9. A system according to claim 1, comprising:
said transformer means comprising first and said transformers each having respective primary and secondary windings, wherein the primary windings of the first and second transformers are adapted to be coupled to respective sources of alternating potential in said energy supply, and the secondary winding of said second transformer is provided with a tap-off connection point;
said impulse superposition means comprising a series circuit including a first rectifier, a first choke, a first impulse capacitor, a second impulse capacitor, a second choke, and a second rectifier bridging the secondary winding of said second transformer, with the interconnection point between the first and second impulse capacitors connected to the tap-off connection point of said secondary winding of said second transformer, said rectifiers arranged in polarity opposition such that voltages opposite in sign are developed across said first and second impulse capacitors, said impulse superposition means further comprising first and second switching elements each have a first side respectively connected to the interconnection point of said first choke and said first impulse capacitor and the interconnection point of said second choke and said second impulse capacitor, and each having second sides mutually interconnected to said other electrode of said ozonizer;

said storage means comprising a storage capacitor briding and secondary winding of said first transformer; and a third choke connected between one side of said storage capacitor and said one electrode of said ozonizer, with the interconnection point of said storage capacitor and said third choke connected to the interconnection point between said first and second impulse capacitors.

10. A circuit according to claims 2, 4, 6, further comprising:

said switching element comprising a rectifier circuit having a D.C. path wherein a voltage sensitive switching element is disposed in said D.C. path.

11. A circuit according to claim 10, wherein said voltage sensitive switching device comprises:

a breakover diode.

12. A system according to claims 2, 4, 6, 7 or 8, wherein said switching element comprises:

an anti-parallel circuit formed of two breakover diodes.

13. A system according to claim 2 wherein said switching element comprises:

a thyristor, a zener diode, and a diode, wherein said zener diode and said diode are connected in series between the gate electrode and the anode of said thyristor.

14. A system according to claim 2, wherein said switching element comprises:

first and second anti-parallel connected thyristors;

a first series connection of a first diode and a first zener diode bridging the anode and the gate electrode of said first thyristor with the anode of said first diode connected to the anode of said first thyristor and the anode of said first zener diode connected to the gate electrode of said first thyristor; and a series connection of a second diode and a second zener diode connected in series between the anode and the gate electrode of said second thyristor, with the anode of said second diode connected to the anode of said second thyristor and the anode of said second zener diode connected to the gate electrode of said second thyristor.

15. An ozonizer provided with at least two electrodes located opposite each other and defining at least one discharge channel, comprising:

an electrically conductive outer tube;

an electrically insulating inner tube arranged within said electrically conductive outer tube, said inner tube distant from said outer tube and electrically insulated therefrom, said inner tube having an inner surface provided with an electrically conductive layer, said electrically conductive layer and said electrically conductive outer tube forming the electrodes of said ozonizer;

an electrically conductive inner body provided within the electrically insulated inner tube; and a switching element connected between the electrically conductive inner body and the electrically conductive layer formed on the inner surface of said inner tube.

16. An ozonizer provided with at least two electrodes located opposite each other and defining at least one discharge channel, comprising:

an electrically conductive outer tube;

an elecrically insulating inner arranged within said electrically conductive outer tube, said inner tube distant from said outer tube and electrically insulated therefrom, said inner tube having an inner surface provided with an electrically conductive layer, said electrically conductive layer and said electrically conductive outer tube forming the electrodes of said ozonizer;

an electrically conductive inner body provided within the electrically insulating tube;

a pair of energy supply lines, one of which is connected to the electrical layer provided on the inner surface of said inner tube; and a switching element arranged between the electrically conductive outer tube and the other of said energy supply lines.

17. An ozonizer provided with at least two electrodes located opposite each other and defining at least one discharge channel, comprising:

an electrically conductive outer tube;

an electrically insulating inner tube arranged within said electrically conductive outer tube, said inner tube distant from said outer tube and electrically insulating therefrom, said inner tube having an inner surface provided with an electrically conductive layer, said electrically conductive layer and said electrically conductive outer tube forming the electrodes of said ozonizer;

at least one switching element connected in series with at least one impulse capacitor, the series combination of which is connected to the electrically conductive layer provided on the inner surface of said inner tube and switched in series therewith upon application of a voltage exceeding a predetermined level on said switching element.

* * * * *